United States Patent [19]

Hoepfner et al.

[11] Patent Number: 4,850,129
[45] Date of Patent: Jul. 25, 1989

[54] BAIT FORMING GUN

[76] Inventors: Paul A. Hoepfner, Rte. 2, Box 43, Wichita Falls, Tex. 76301; William D. Hofacket, 4666 University; Gary E. Ellis, 2305 Hayes, both of Wichita Falls, Tex. 76308

[21] Appl. No.: 213,628

[22] Filed: Jun. 30, 1988

[51] Int. Cl.⁴ ............... A01K 97/00; A01K 97/04; F41F 1/00
[52] U.S. Cl. ............... 43/4; 43/55; 124/37
[58] Field of Search ........... 43/42.53, 4, 54.1, 55; 269/8; 124/37

[56] References Cited

U.S. PATENT DOCUMENTS

| | | | |
|---|---|---|---|
| 299,436 | 5/1884 | Stockman | 124/37 |
| 1,955,559 | 4/1934 | Narrow | 43/55 |
| 2,846,803 | 8/1958 | Rettig | 43/4 |
| 2,924,211 | 2/1960 | McSwain | 124/37 |
| 3,245,172 | 4/1966 | Hawks | 43/55 |
| 3,308,570 | 3/1967 | Horton | 43/55 |
| 3,964,204 | 6/1976 | McKinley | 43/55 |
| 4,047,320 | 9/1977 | Lee | 43/55 |
| 4,428,146 | 1/1984 | Walker | 43/55 |
| 4,483,092 | 11/1984 | Steiner | 43/55 |

Primary Examiner—Nicholas P. Godici
Assistant Examiner—William S. Andes
Attorney, Agent, or Firm—Leon Gilden

[57] ABSTRACT

A bait forming gun is set forth for the formation of bait associated with fishing. A tray containing a dough-like bait composition is positioned for accepting a forward portion barrel of the gun wherein previously a fishing hook has been inserted through a first axial slot along the barrel wherein upon imposing of the barrel into the bait, the barrel is twisted to sever the bait and encase the fishing hook with the bait. A second diametrically opposed slot within a forwardmost portion of the barrel of an axial extent greater than that of the first slot is positioned to prevent sticking of the bait within the barrel when an associated release plunger is depressed and a spring biased magnet normally holding the bait and hook forced forwardly to eject the bait and hook from the gun.

5 Claims, 1 Drawing Sheet

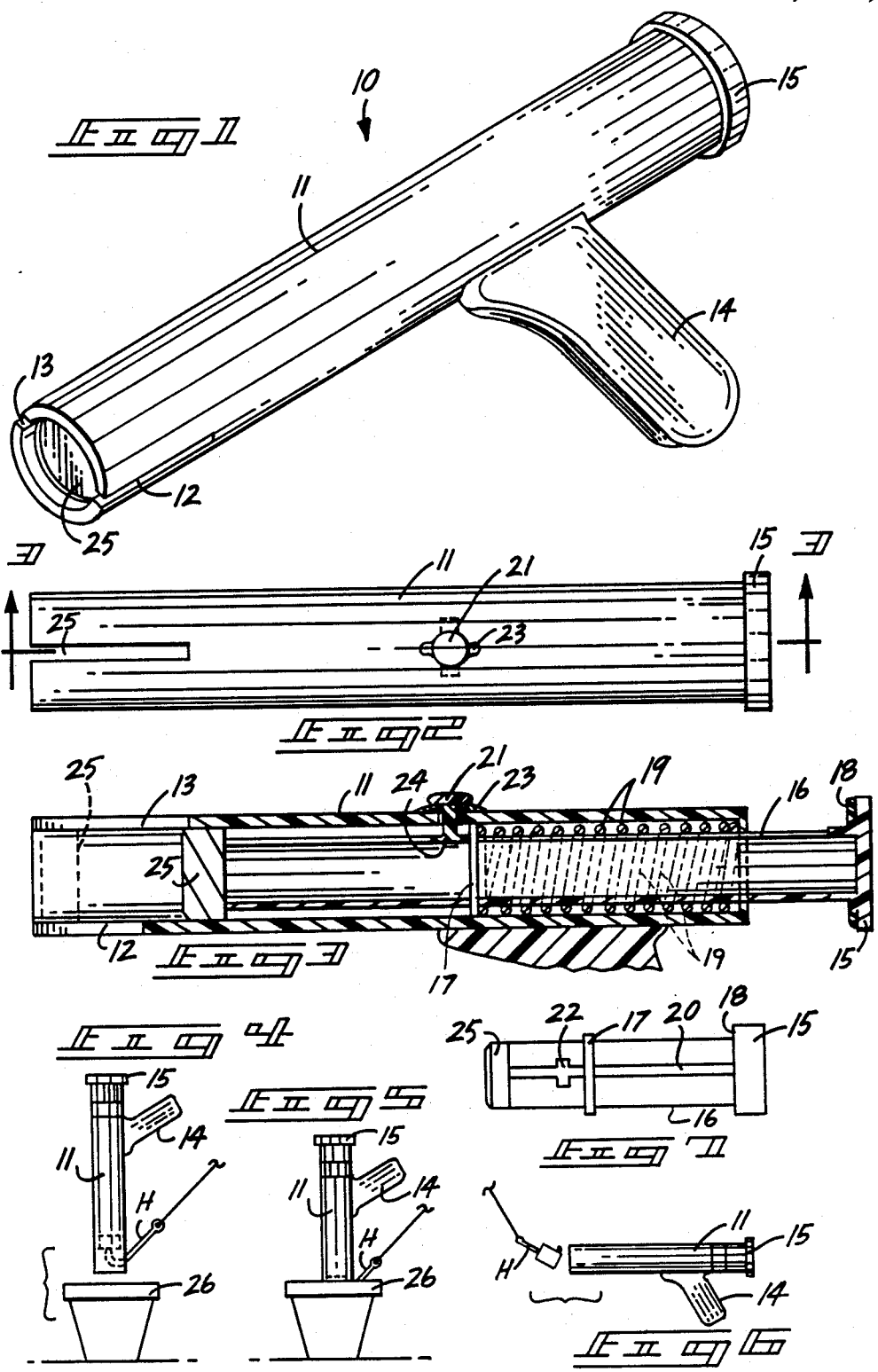

BAIT FORMING GUN

BACKGROUND OF THE INVENTION

1. Field of the Invention

The instant invention relates to bait forming devices and more particularly pertains to a new and improved bait gun for encasing a dough-like bait about an associated fishing hook.

2. Description of the Prior Art

The use of bait dispensing and forming devices is well known in the prior art. As may be appreciated, these devices have been formed for use in combination with pre-formed bait wherein the instant invention in contradistinction sets forth a bait forming device to encase a dough-like baiting material about a fishhook.

Examples of prior art bait implements may be seen in a series of patents. For example, U.S. Pat. No. 3,245,172 to Hawks sets forth a worm holder and dispenser wherein an enclosure is provided with a plurality of elongate orthogonal passages communicating with a removable plug wherein worms may be selectively removed from the enclosure. The Hawks patent is typical of bait dispensing devices, but as may be appreciated, is of a construction relatively remote from that of the instant invention.

U.S. Pat. No. 3,308,570 to Horton sets forth a bait holding container for containing fishing bait to be selectively removed by use of an associated hook for subsequent fishing procedures.

U.S. Pat. No. 3,964,204 to McKinley sets forth a container and bait dispenser wherein an enclosure is formed with an openable cover with a key-like slot and rotatable shaft extending therethrough wherein an arm extending radially from the shaft is shaped to engage fish bait within an enclosure and lift the bait through the opening for subsequent use.

U.S. Pat. No. 4,428,146 to Walker sets forth a bait dispensing container wherein a magazine of bait secured within an enclosure with an underlying outlet provided with a slot wherein a fishhook may be utilized to secure a discrete bait element.

U.S. Pat. No. 4,483,092 to Steiner sets forth a bait storing apparatus formed with a reciprocating plunger for exposing selective bait elements for use in a fishing procedure wherein typically a plurality of such bait is stored within a replenishable magazine.

As such, it may be appreciated that there is a continuing need for a new and improved bait forming apparatus that effectively and efficiently forms cylindrical dough-like bait associated to a fishhook and in this respect, the present invention substantially fulfills this need.

SUMMARY OF THE INVENTION

In view of the foregoing disadvantages inherent in the known types of bait forming devices now present in the prior art, the present invention provides a bait forming gun wherein the gun is formed with a first elongate slot for accepting a hook and a second elongate slot for minimizing adherence of a dough-like bait within the gun wherein the gun produces efficiently and effectively a series of baited encased hooks. As such, the general purpose of the present invention, which will be described subsequently in greater detail, is to provide a new and improved bait forming gun which has all the advantages of the prior art bait forming devices and none of the disadvantages.

To attain this, the present invention comprises a gun formed with an orthogonally oriented handle relative to an axially aligned tube wherein the tube is formed with a first elongate slot for accepting a hook from a fishing environment wherein the hook is secured to a forward portion of a ram within a gun by a magnet with a second slot diametrically opposed to said first slot of greater axial extent to minimize sticking of the dough-like material utilized in encasing the associated hook upon ejection from the gun. A release plunger is formed opposed to said handle for releasing said ram from a retracted position subsequent to the bait forming procedure.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientist, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved bait forming gun which has all the advantages of the prior art bail forming devices and none of the disadvantages.

It is another object of the present invention to provide a new and improved bait forming gun which may be easily and efficiently manufactured and marketed.

It is a further object of the present invention to provide a new and improved bait forming gun which is of a durable and reliable construction.

An even further object of the present invention is to provide a new and improved bait forming gun which is capable of a low cost of manufacture with regard to both materials and labor, and which accordingly is then capable of low prices of sale to the consuming public, thereby making such bait forming guns economically available to the buying public.

Still yet another object of the present invention is to provide a new and improved bait forming gun which provides in the apparatuses and methods of the prior art some of the advantages thereof, while simultaneously overcoming some of the disadvantages normally associated therewith.

Still another object of the present invention is to provide a new and improved bait forming gun wherein a dough-like baiting material is utilized to encase an associated fishhook within a tubular forming gun that incorporates a spring biased ram selectively releasable subsequent to a bait forming procedure to eject the encased fish hook from the gun.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is an isometric illustration of the instant invention.

FIG. 2 is a top orthographic view of the instant invention.

FIG. 3 is an orthographic view taken along the lines 3—3 of FIG. 2.

FIG. 4 is an orthographic illustration taken in elevation of a first step in bait formation.

FIG. 5 is an orthographic view taken in elevation of a second step in bait formation.

FIG. 6 is an orthographic view taken in elevation of a final step in removal of a properly baited hook.

FIG. 7 is a top orthographic view of the plunger of the instant invention.

DESCRIPTION OF THE PREFERRED EMBODIMENT

With reference now to the drawings, and in particular to FIGS. 1 to 7 thereof, a new and improved bait forming gun embodying the principles and concepts of the present invention and generally designated by the reference numeral 10 will be described.

More specifically, it will be noted that the bait forming gun 10 essentially comprises an aligned outer tube 11 formed within a first axially oriented hook slot 12 of a first length to accept a hook "H", essentially as illustrated in FIGS. 4 and 5, diametrically opposed to a second slot 13 of a length greater than that of said first slot to extend axially parallel to the tube and the travel of associated ram head 25. The second slot 13 is of a length to extend the entire distance of ram movement to minimize sticking of dough utilized in the formation of bait from sticking to the interior surface of the outer tube 11.

A handle 14 is generally orthogonally formed relative to an elongate axis defining the outer tube 11 for manual grasping thereof in the manipulation of the apparatus.

A grasping head 15 is oriented outwardly of the tube 11 for manual grasping thereof for retraction of the sleeve 16 reciprocatably slidable within the tube 11. A shock absorbing cushion 18 is circumferentially formed to an inner confronting flange surface of the head 15 to the tube 11 to minimize shock and vibration as the grasping head 15 is returned to a normal position adjacent the tube 11. Formed circumferentially of the sleeve 16 is a spring engagement rib 17 to trap an associated coil spring 19 between the rib 17 and a rear flange formed on the tube 11 to bias the tube 11 to a forward orientation, as illustrated in FIG. 1 for example.

A plunger slot 20 is formed axially along an outer surface of the sleeve 16 for slidingly accepting the body of the associated plunger 21 therethrough wherein an enlarged plunger head 24 is receivable within a plunger arresting slot 22 formed orthogonally to the plunger slot 20. A leaf spring 23 repositions the plunger 21 for a normal registration within the plunger slot 22 until manually depressed to thereby drop the plunger head 24 below and interiorly of a surface wall of the sleeve 16 to enable the body of the plunger 21 to ride within the slot 20 and enable the sleeve 16 to return to a normally forward orientation, as illustrated in FIG. 1.

A ram head 25 formed forwardly of the sleeve 16 is of a magnetic material to maintain registration of a hook "H" positioned thereagainst and through the first slot 12 whereupon forcing of the gun apparatus 10 downwardly through a bait pan 26, as illustrated in FIG. 4, the ram head 25 and associated sleeve 16 are forced rearwardly against the action of the coil spring 19 and enable registration of the plunger head 24 within the plunger arresting slot 22. Upon withdrawal of the apparatus 10 from the bait pan and associated dough therein, the plunger 21 is depressed releasing action of the spring 19 and enabling the sleeve 16 to proceed forwardly and eject the encased dough hook "H", as illustrated in FIG. 6.

It is helpful when forcing the forward end of the outer tube 11 into the bait pan 26, as illustrated in FIGS. 4 and 5, that the outer tube 11 be rotated approximately one-quarter turn to effect severing of the dough within the sleeve 11.

The magnetized ram head 25 enables securement of the hook "H" thereagainst and minimizes dislodgment of the hook between the bait forming procedure.

The manner of usage and operation of the instant invention therefore should be apparent from the above description. Accordingly, no further discussion relative to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A bait forming gun device for encasing a fishing hook in a dough-like baiting material, said device comprising, an elongate tube including a first open end formed with a first slot originating from said first open end and extending rearwardly and axially of said tube, and a second slot circumferentially displaced from said first slot wherein said first and second slots are parallel to a central axis of said tube, said second slot defining a second slot length and said first slot defining a first slot length wherein said second slot length is greater than said first slot length, and a reciprocating sleeve slidably received within said tube formed with a first ram and positionable in a first position proximate said open end and a second grasping end remote from said ram end arranged for manual grasping to displace said sleeve and said first ram end to a second position removed from said first end a distance within said tube substantially equal to said second slot length, and latch means to selectively secure said sleeve in said position, and wherein said ram is formed of a magnetic material for securement of said hook thereto.

2. A bait forming gun device as set forth in claim 1 wherein said first slot and said second slot are diametrically opposed to one another along said tube.

3. A bait forming gun device as set forth in claim 2 wherein a manually depressible plunger is positioned orthogonally through said tube and formed with an enlarged head for engagement within a plunger arresting slot positioned within said sleeve, said plunger arresting slot orthogonally arranged relative to a plunger slot axially arranged along said sleeve wherein manual depression of said plunger enables said plunger to be slidingly received within said plunger slot.

4. A bait forming gun device as set forth in claim 3 wherein a cushion is circumferentially arranged on said sleeve adjacent said manual grasping end for cushioning engagement of said manual grasping end with said tube.

5. A bait forming gun device as set forth in claim 4 wherein said plunger is normally biased upwardly to maintain engagement of said plunger heat within said arresting slot when said sleeve is in said second position, and a leaf spring arranged around said plunger to bias said plunger outwardly of said tube.

* * * * *